United States Patent
Wuidart

(10) Patent No.: US 8,010,585 B2
(45) Date of Patent: Aug. 30, 2011

(54) CHECKING THE INTEGRITY OF PROGRAMS OR THE SEQUENCING OF A STATE MACHINE

(75) Inventor: Sylvie Wuidart, Pourrieres (FR)

(73) Assignee: STMicroelectronics S.A., Montrouge (FR)

(*) Notice: Subject to any disclaimer, the term of this patent is extended or adjusted under 35 U.S.C. 154(b) by 1238 days.

(21) Appl. No.: 11/704,808

(22) Filed: Feb. 9, 2007

(65) Prior Publication Data
US 2007/0234149 A1    Oct. 4, 2007

(30) Foreign Application Priority Data

Feb. 10, 2006  (FR) ...................... 06 50488

(51) Int. Cl.
*G06F 15/00* (2006.01)
(52) U.S. Cl. ...................................... 708/200
(58) Field of Classification Search .............. 708/200
See application file for complete search history.

(56) References Cited

U.S. PATENT DOCUMENTS

| | | | | |
|---|---|---|---|---|
| 5,457,789 A * | 10/1995 | Dietrich et al. | ............... | 711/100 |
| 7,330,979 B1 * | 2/2008 | Hazard | .................. | 713/193 |
| 2003/0061499 A1 | 3/2003 | Durrant | | |
| 2003/0204696 A1 | 10/2003 | Yi | | |

FOREIGN PATENT DOCUMENTS

WO    WO 01/03084 A1    1/2001

OTHER PUBLICATIONS

French Search Report from corresponding French Application No. 06/50488 filed Feb. 10, 2006.

* cited by examiner

*Primary Examiner* — Tan V Mai
(74) *Attorney, Agent, or Firm* — Lisa K. Jorgenson; James H. Morris; Wolf, Greenfield & Sacks, P.C.

(57) ABSTRACT

A method and a circuit for protecting the execution of a calculation by an electronic circuit, conditioning a result of the calculation to states of bits indicative of executions of steps of access in read mode and/or in write mode to storage elements.

30 Claims, 2 Drawing Sheets

CHECKING THE INTEGRITY OF PROGRAMS OR THE SEQUENCING OF A STATE MACHINE

BACKGROUND OF THE INVENTION

1. Field of the Invention

The present invention generally relates to electronic circuits and, more specifically, to checking the integrity of programs executed by a processor or checking the sequencing of a state machine in wired logic.

The present invention, for example, applies to processing circuits of microcontroller type capable of manipulating digital quantities intended to remain secret. It may, for example, apply to ciphering calculations.

2. Discussion of the Related Art

FIG. 1 very schematically shows a smart card 1 of the type to which the present invention applies. Such a card is for example formed of a plastic support 2 on or inside of which is placed an electronic circuit chip 10 capable of communicating with the outside by means of contacts 3 or by means of contactless transmission/reception elements.

FIG. 2 very schematically shows, in the form of blocks, a conventional example of an electronic circuit 10 of the type to which the present invention applies. This circuit comprises a central processing unit 11 (CPU) capable of executing programs contained in one or several memories. In this example, a single memory 12 (MEM) is shown, but the circuit may comprise several memories, respectively volatile and non-volatile, reprogrammable or not. One or several data, control, and address buses 13 are used as a communication support between the different components of circuit 10 and with an input/output interface 14 (I/O) for communication with or without contact with the outside. Most often, circuit 10 comprises other functions (block 15, FCT) depending on the application, and even a coprocessor 16 (CPROC), for example dedicated to cryptographic calculations.

On execution of programs manipulating secret quantities, the introduction of a disturbance in the processor operation (for example, by disturbing the circuit power supply) may enable finding the manipulated digital quantities by analysis of the generated results. Such attacks are generally called fault-injection attacks.

A known solution to protect calculations against such attacks is to condition the provision of the result on the electronic circuit output to a test on the calculated result, to check that the execution of the calculation has not been disturbed.

FIG. 3 shows, in simplified fashion, an example of a conventional flowchart of execution of a cryptographic calculation OP protected against fault injections. A digital quantity I to be processed is submitted to calculation OP. Then, the obtained result R is submitted to the inverse calculation (block 21, $OP^{-1}$). The quantity I' obtained at the output of block 21 is then compared with input data I (block 22, I'=I?). If the two quantities are identical (output Y of block 22), this means that the calculation has not been disturbed and the electronic circuit then outputs the result (block 23, OUTPUT R). In the opposite case (output N of block 22), the electronic circuit applies an error processing procedure (ERROR) to protect its content. For example, in the case of a smart card, this consists of muting the smart card.

A problem which remains in an integrity check mechanism of the type illustrated in FIG. 3 is that, if a fault is introduced at the time of test 22, said test is not executed and result R can still be provided.

A known solution to fight this type of attacks is to calculate a signature of the executed opcode to check this signature against a prerecorded signature before providing the result.

A disadvantage is that, for the signature to be predictable, the executed program code needs to be deterministic (the executed codes and their order need to be determinable in advance to calculate the reference signature). In particular, this prevents adding of random steps in the calculation to desynchronize it, unless a tolerance is accepted on the calculated signature, which then adversely affects the security. Currently, deterministic programs are more vulnerable to another category of attacks, that is, statistic power analysis attacks of the circuit on execution of the calculations.

Another disadvantage is that this complicates the updating of the programs contained in the circuit, since such updatings should in principle respect the original signature, which is in practice almost impossible.

Similar problems are posed for state machines in wired logic (for example, cells of execution of ciphering algorithms or the state machine of a microprocessor core) which are also sensitive to fault injection attacks, be the state machines reprogrammable (FPGA) or not.

SUMMARY OF THE INVENTION

The present invention aims at overcoming all or part of the disadvantages of known solutions for detecting and/or for checking of the integrity of programs executed by an electronic circuit.

The present invention more specifically aims at enabling checking the integrity of an executed code, independently from the sequencing of this code and, especially, from the order of the steps.

The present invention also aims at providing a solution compatible with a desynchronized execution of a program.

The present invention also aims at a solution applicable to state machines.

To achieve all or part of these objects as well as others, the present invention provides a method for protecting the execution of a calculation by an electronic circuit, conditioning a result of the calculation to states of checking bits respectively assigned to said storage elements and set to an active state when the corresponding storage element is accessed during the execution of the calculation independently from the content of thus storage element.

According to an embodiment of the present invention, the result to be provided is multiplied by the product of the checking bits before provision by the circuit, said checking bits having an active state at 1.

According to an embodiment of the present invention, each bit of the result to be provided is combined by an OR-type combination with a control bit, said control bit being obtained with an OR-type combination of all the checking bits and said checking bits having an active state at 0.

According to an embodiment of the present invention, each temporary storage elements of the electronic circuit comprises one of said checking bits.

According to an embodiment of the present invention, the checking bits are a function of the circuit storage elements which must be used by the calculation.

According to an embodiment of the present invention, said checking bits are initialized before each execution of the calculation.

The present invention also provides an electronic circuit comprising a processing unit for executing at least one calculation, and at least one set of temporary storage elements, a checking bit being assigned to each element, this bit being settable to an active state in an access in read mode and/or in write mode of the concerned element.

The foregoing and other objects, features, and advantages of the present invention will be discussed in detail in the following non-limiting description of specific embodiments in connection with the accompanying drawings.

DETAILED DESCRIPTION

Figure 1:
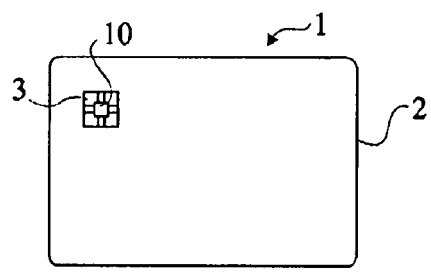
FIG. 1, previously described, shows an example of application of the present invention.

The same elements have been designated with the same reference numerals in the different drawings. For clarity, only those steps and elements which are useful to the understanding of the present invention have been shown in the drawings and will be described hereafter. In particular, the actual execution of the program by the circuit has not been detailed, the present invention being compatible with any conventional program executed by a circuit.

A feature of the present invention is to condition a calculation result provided by an electronic circuit to the execution of steps of access in read or in write mode to storage elements, preferably volatile.

The present invention will be described in relation with an example of application to the execution of a program stored in a memory but all that will be described also applies, unless otherwise mentioned, to state machines which also use storage elements.

Temporary storage elements are provided in the electronic circuit to store the respective states of bits dedicated to certain storage elements. The bits are by default in a first state (for example, 0) and are switched to the other state (for example, 1) when the program accesses the corresponding storage element. Accordingly, if for any reason (for example, a jump in the program after a fault injection), the program does not access a monitored element, the corresponding bit is not updated. At the end of the calculation, the bits of the calculated result are combined with the monitoring bits to condition the provided result.

According to a first example, the monitoring bits initialized at 0 are activated to state 1 when the corresponding storage element has been read and/or written. The calculated result is then multiplied by a control bit obtained by the product of all the monitoring bits. Thus, if one of the bits has remained at state 0, the provided result is null. Accordingly, even if integrity check tests are skipped due to a fault injection, the provided result will not be exploitable.

According to another example, the monitoring bits initialized at 1 are activated to state 0 when the corresponding storage element has been read and/or written. The calculated result is then combined by an OR with a control bit obtained by the combination of all the checking bits. Here again, if one of the bits has remained at state 1, the provided result is null.

The present invention takes advantage from the fact that, even if a calculation is executed in a different order or is desynchronized, at least some of the temporary storage registers used for the calculation remain the same from one execution to another.

On writing of a program to be executed, the hardware registers or the storage elements (for example, RAM word addresses) are known. It is thus possible to set those of the monitoring bits to be taken into account for the output result.

Figure 3:
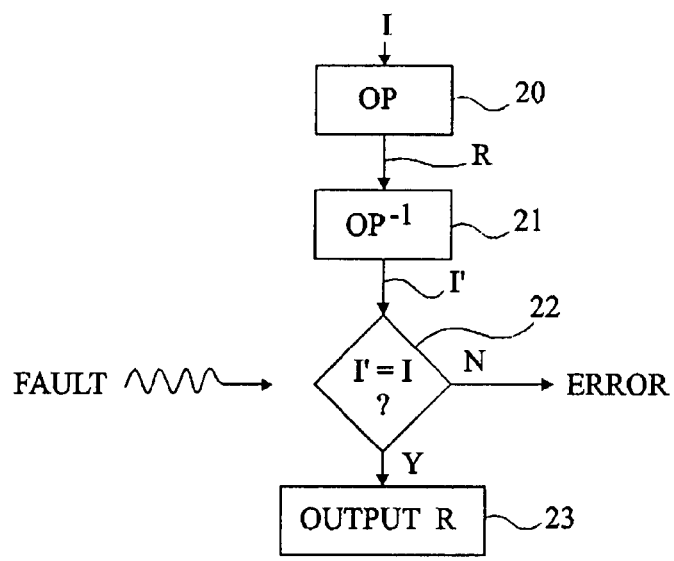
FIG. 3 is a conventional simplified flowchart of the execution of an opcode to illustrate the state of the art and the problem to solve.
Figure 4:
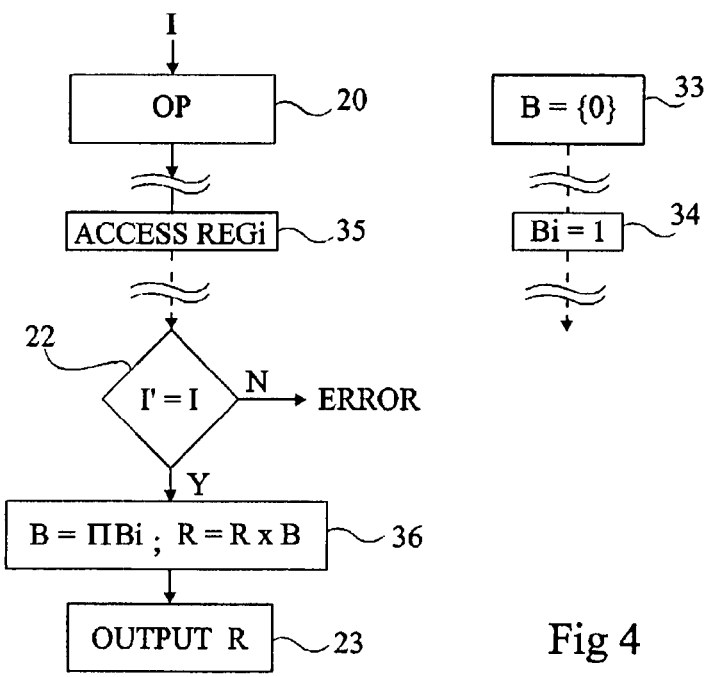
FIG. 4 shows a partial simplified flowchart implementing the present invention.

FIG. 4 very schematically shows, in a view to be compared with FIG. 3, an embodiment of the present invention.

As previously, the execution of a calculation is performed from a digital quantity I to obtain a result R (output of block 20, OP). As previously still, and although not shown in FIG. 4, an inverse operation is preferably performed from result R to obtain a quantity I' to check the integrity of the calculation. Then, quantities I and I' are compared (block 22, I=I' ?) to check that all the steps have been properly executed.

According to this embodiment of the present invention, in case of an identity between values I and I' (output Y of block 22), result R is multiplied (block 36, B=πBi; R=R*B) by product B of checking bits Bi, and the result of this multiplication is provided as the result of the calculation (block 23, OUTPUT R). All bits Bi are set to 0 at the beginning of the calculation (block 33, B={0}). Each bit Bi is assigned to a register REGi or storage element used in the calculation and is set to state 1 (block 34, Bi=1) when this element is read or written by the program (block 35, ACCESS REGi).

If all the steps have been properly executed, the output result corresponds to result R since all bits Bi are at state 1. However, if the smallest step of writing or reading of a register has not occurred, the output result will be null since one of these bits will have remained at state 0.

Further, if after a disturbance introduced into the calculation, a user or hacker who attempts avoiding test 22 (case illustrated in FIG. 3), thinking to prevent the system from reacting, the output result will be unexploitable if steps of the calculation have not been carried out.

Figure 5:
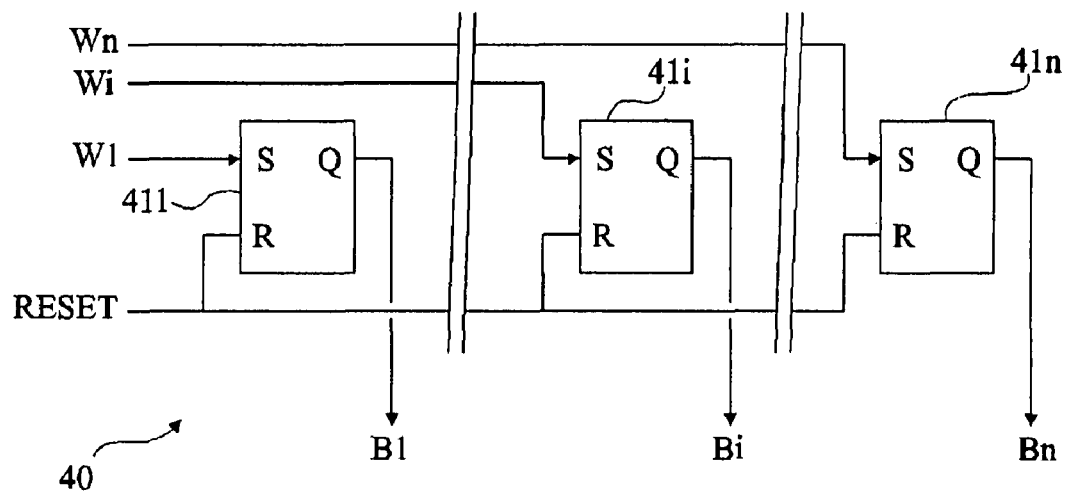
FIG. 5 very schematically shows in the form of blocks an embodiment of a control word according to the present invention.

FIG. 5 very schematically shows in the form of blocks an example of a circuit 40 for implementing the present invention.

In this example, n bits B1, Bi, Bn are provided by R-S-type flip-flops 411, 41i, 41n having their respective inputs for setting to 1 (S) receiving write signals Wi (i ranging between 1 and n) in the associated storage elements and having their direct outputs (Q) providing bits Bi. As a variation, the input for setting to 1 is not only controlled by the writing into but also by the reading from the concerned register, that is, by any access to this register. The R reset inputs of all flip-flops 41 are interconnected to be reset on each calculation beginning or on each initialization of the electronic circuit executing the calculation.

The activation of bits Bi is particularly simple since it uses no specific control signal. It is enough, in hardware fashion in the circuit, for the read/write control signals of the registers to be monitored to be sampled, to be connected, if need be via level adaptation elements, to set inputs of the flip-flops.

Figure 2:
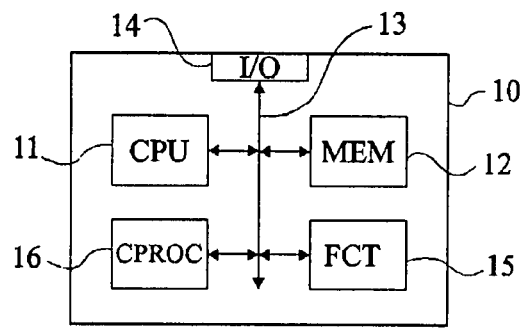
FIG. 2, previously described, very schematically shows in the form of blocks an example of an electronic circuit of the type to which the present invention applies.
Figure 6:
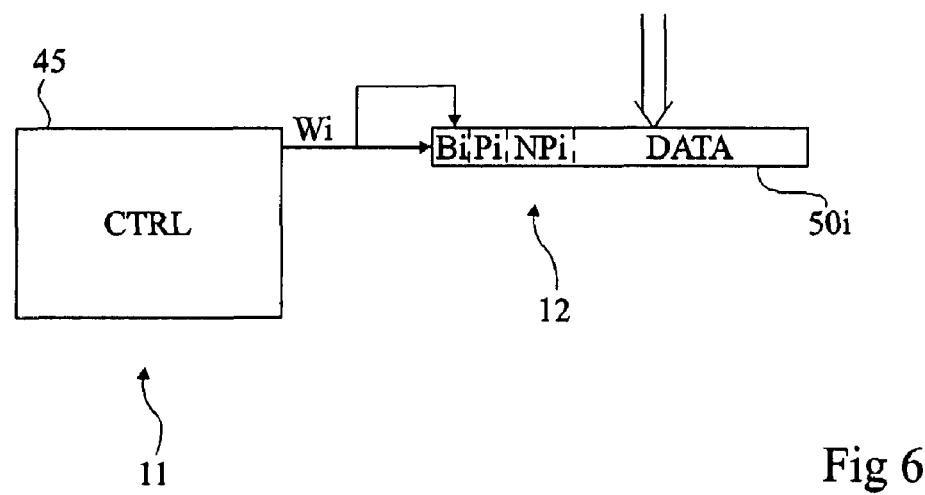
FIG. 6 schematically and functionally shows an example of a circuit implementing the present invention.

FIG. 6 schematically and partially shows an example of embodiment of the present invention in which each checking bit Bi of a data register 50i corresponds to the addition of a bit in this memory register. In the example of FIG. 6, the data stored in register 50i are completed, in addition to the parity and inverse parity bits Pi and NPi, by checking bit Bi. This bit is, at the input, updated by signal Wi provided by a read-write control circuit 45 (CTRL). Circuit 45 for example belongs to central unit 11 (FIG. 2) while registers 50, for example, belong to memory 12.

An advantage of the present invention is that the performed countermeasure is independent from the order of execution of the calculation steps.

Another advantage of the present invention is that since the checking bits are provided in the hardware circuit structure, they are difficult to hack. It should indeed be possible to inject a hardware error to force the different bits to the active state.

Another advantage of the present invention is that its implementation is easy. Indeed, on writing of the program, it is enough to take the used registers into account to take the corresponding monitoring bits into account in the forming of control bit B to be multiplied by the output calculation result.

The selection of the registers to be monitored may depend on the steps considered as critical as to the security of the data manipulated in the program to be monitored.

Another advantage of the present invention is that it is compatible with updatings of the programs in the electronic circuits, provided for the hardware circuit in which they are executed to have, for each register or memory word capable of being updated, one checking bit.

Of course, the present invention is likely to have various alterations, modifications, and improvements which will readily occur to those skilled in the art. In particular, the practical implementation of the present invention based on the functional indications given hereabove is within the abilities of those skilled in the art by using tools known per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting the execution of a calculation by an electronic circuit, the method comprising:
to determine a result of the calculation, performing at least one operation involving at least a preliminary result of the calculation and states of checking bits, each of the checking bits being respectively assigned to a corresponding storage element and set to an active state when the corresponding storage element is accessed during the execution of the calculation, independently from content of the storage element.

2. The method of claim 1, wherein performing the at least one operation comprises multiplying the preliminary result by a product of the states of the checking bits to determine the result, said at least two checking bits having an active state at 1.

3. The method of claim 1, wherein performing the mathematical operation comprises performing an OR-type combination of each bit of the preliminary result with a control bit to determine the result, said control bit being obtained by an OR-type combination of the states of all the checking bits and said checking bits having an active state at 0.

4. The method of claim 1, wherein each temporary storage elements of the electronic circuit comprises one of said checking bits.

5. The method of claim 1, wherein the checking bits are a function of the circuit storage elements which need to be used by the calculation.

6. The method of claim 1, wherein said checking bits are initialized before each execution of the calculation.

7. An electronic circuit comprising:
a processing unit for executing at least one calculation, and
at least one set of temporary storage elements, wherein a checking bit is assigned to each corresponding temporary storage element of the at least one set of temporary storage elements, each checking bit being settable to an active state when an access in read mode and/or in write mode is performed on the corresponding temporary storage element.

8. The circuit of claim 7, further comprising means for, to determine a result of the at least one calculation, performing a mathematical operation involving at least a preliminary result of the at least one calculation and states of checking bits, each of the checking bits being respectively assigned to a corresponding storage element and set to an active state when the corresponding storage element is accessed during the execution of the calculation, independently from content of the storage element.

9. A method for protecting of operations of a circuit, the circuit comprising at least one storage element and maintaining at least one checking bit each corresponding to one of the at least one storage element, the method comprising:
upon access of a storage element during the operations, changing a value of a checking bit corresponding to the storage element;
calculating a preliminary result of the operations; and
determining the result of the operations by performing at least one operation involving the preliminary result and at least one value of the at least one checking bit.

10. The method of claim 9, wherein changing the value of the checking bit upon access of the storage element comprising changing the value of the checking bit upon performing a read of the storage element and/or a write to the storage element.

11. The method of claim 9, wherein changing the value of the checking bit upon access of the storage element comprises, for each storage element, changing the value of the checking bit upon a first access of the storage element and refraining from changing the value of the checking bit upon a subsequent access of the storage element.

12. The method of claim 9, wherein determining the result of the operations by performing the at least one operation comprises performing an arithmetic operation involving the preliminary result and the at least one value of the at least one checking bit.

13. The method of claim 12, wherein performing the arithmetic operation comprises multiplying the preliminary result by a product of the at least one value.

14. The method of claim 13, wherein changing the value of the checking bit upon access of the storage element comprises changing the value of the checking bit from a zero to a one upon access of the storage element.

15. The method of claim 9, wherein determining the result of the operations by performing the at least one operation comprises performing a logical operation involving the preliminary result and the at least one value of the at least one checking bit.

16. The method of claim 15, wherein performing the logical operation comprises:
determining a control bit by performing a first logical OR operation on the at least one value of the at least one checking bit; and
performing a second logical OR operation on the control bit and each bit of the preliminary result.

17. The method of claim 16, wherein changing the value of the checking bit upon access of the storage element comprises changing the value of the checking bit from a one to a zero upon access of the storage element.

18. The method of claim 9, further comprising:
prior to performing the operations, initializing the values of the checking bits.

19. An apparatus comprising:
at least one first storage element;
a second storage element storing at least one checking bit, each bit of the at least one checking bit corresponding to a first storage element of the at least one first storage element; and
a calculation circuit to access the at least one first storage element, to change a value of a checking bit in the second storage element when a corresponding first storage element is accessed, and to calculate a result of operations to be protected by performing at least one operation involving a preliminary result of the operations and at least one value of the at least one checking bit.

20. The apparatus of claim 19, wherein the second storage element is a temporary storage element.

21. The apparatus of claim 19, wherein the second storage element is a register.

22. The apparatus of claim 19, wherein the calculation circuit changes the value of the checking bit upon access of the corresponding first storage element upon performing a read of the corresponding first storage element and/or a write to the corresponding first storage element.

23. The apparatus of claim 19, wherein the calculation circuit changes the value of the checking bit upon access of the corresponding first storage element at least in part by, for each storage element, changing the value of the checking bit upon a first access of the corresponding first storage element and refraining from changing the value of the checking bit upon a subsequent access of the corresponding first storage element.

24. The apparatus of claim 19, wherein the calculation circuit performs the at least one operation at least by performing an arithmetic operation involving the preliminary result and the at least one value of the at least one checking bit.

25. The apparatus of claim 24, wherein the calculation circuit performs the arithmetic operation at least in part by multiplying the preliminary result by a product of the at least one value.

26. The apparatus of claim 25, wherein the calculation circuit changes the value of the checking bit upon access of the corresponding first storage element at least in part by changing the value of the checking bit from a zero to a one upon access of the corresponding first storage element.

27. The apparatus of claim 19, wherein the calculation circuit performs the at least one operation at least by performing a logical operation involving the preliminary result and the at least one value of the at least one checking bit.

28. The apparatus of claim 27, wherein the calculation circuit performs the logical operation at least in part by:
determining a control bit by performing a first logical OR operation on the at least one value of the at least one checking bit; and
performing a second logical OR operation on the control bit and each bit of the preliminary result.

29. The apparatus of claim 28, wherein the calculation circuit changes the value of the checking bit upon access of the corresponding first storage element at least in part by changing the value of the checking bit from a one to a zero upon access of the storage element.

30. The apparatus of claim 19, wherein the calculation circuit further performs an initialization of the at least one checking bit of the second storage element prior to any access of the at least one first storage element.

* * * * *